US005372886A

United States Patent [19]

Inazawa et al.

[11] Patent Number: 5,372,886

[45] Date of Patent: Dec. 13, 1994

[54] INSULATED WIRE WITH AN INTERMEDIATE ADHESION LAYER AND AN INSULATING LAYER

[75] Inventors: Shinji Inazawa; Kouichi Yamada; Kazuo Sawada, all of Osaka, Japan

[73] Assignee: Sumitomo Electric Industries, Ltd., Osaka, Japan

[21] Appl. No.: 23,077

[22] Filed: Feb. 26, 1993

Related U.S. Application Data

[63] Continuation-in-part of Ser. No. 613,711, Dec. 6, 1990, abandoned.

[30] Foreign Application Priority Data

Mar. 28, 1989 [JP] Japan .................................... 1-77028
Mar. 20, 1990 [JP] Japan .................................... 2-70843

[51] Int. Cl.[5] ........................ B32B 9/00; B32B 18/00; H01B 7/00

[52] U.S. Cl. .................................... 428/384; 428/377; 428/380; 428/389; 428/381; 428/400; 174/110 A

[58] Field of Search ............... 428/379, 372, 381, 384, 428/387, 389; 174/110 A, 126.2

[56] References Cited

U.S. PATENT DOCUMENTS

| | | | |
|---|---|---|---|
| 2,495,630 | 1/1950 | Dorst | 174/110 A |
| 3,109,053 | 10/1963 | Ahearn | 174/110 A |
| 5,091,609 | 2/1992 | Sawada et al. | 174/110 A |

FOREIGN PATENT DOCUMENTS

| | | | |
|---|---|---|---|
| 188369 | 7/1986 | European Pat. Off. . | |
| 188370 | 7/1986 | European Pat. Off. . | |
| 5266743 | 10/1993 | Japan | 174/110 A |
| 8600747 | 1/1986 | WIPO . | |

OTHER PUBLICATIONS

Journal of Materials Science No. 12, (1977) pp. 1203-1208 (copy in parent case).

ISO468-1982 Surface Roughness Standard (copy in parent case).

*Primary Examiner*—Patrick J. Ryan
*Assistant Examiner*—Jill M. Gray
*Attorney, Agent, or Firm*—W. G. Fasse; W. F. Fasse

[57] ABSTRACT

An insulated wire is suitable for use as a distribution wire, a wire for winding a coil or the like, which is used in a high-vacuum environment or in a high-temperature environment such as a high vacuum apparatus or a high temperature service apparatus. The insulated wire has a base material (1) forming a substrate, a chromium oxide $CrO_{3-x}$ containing intermediate layer (2) on the substrate, and an oxide insulating layer (3) on the intermediate layer. The base material (1) is an electrical conductor. The chromium oxide containing layer (2) is so formed that the ratio of oxygen to chromium O/Cr is not less than 0.5 but less than 1.5 to avoid the formation of chromic oxide $Cr_2O_3$ which reduces the adhesive bonding strength. The oxide insulating layer (3) is formed by applying a precursor solution of a metallic oxide onto the chromium oxide containing layer (2) by a sol-gel method or an organic acid salt pyrolytic method. This insulated wire exhibits a high heat resistance and insulation ability as well as excellent flexibility, and does not provide any gas adsorption source when the wire is used in a vacuum device.

11 Claims, 4 Drawing Sheets

INSULATED WIRE WITH AN INTERMEDIATE ADHESION LAYER AND AN INSULATING LAYER

CROSS-REFERENCE TO RELATED APPLICATION

This application is a continuation-in-part application of our copending U.S. patent application Ser. No. 07/613,711, filed on Dec. 6, 1990, now abandoned, for INSULATED WIRE.

FIELD OF THE INVENTION

The present invention relates to an insulated wire, and more particularly, it relates to an insulated wire such as a distribution wire, a wire suitable for winding or the like which is employed in a high-vacuum environment or high-temperature environment such as a high-vacuum apparatus or a high-temperature service apparatus.

BACKGROUND INFORMATION

An insulated wire may be used in equipment such as heating equipment or a fire alarm, which requires a safe operation even under high temperature operating conditions. Further, insulated wires are also used in an automobile, wherein the vicinity of the engine, for example, is heated to a high temperature. An insulated wire formed as a conductor which is coated with a heat resistant organic resin such as polyimide, fluorocarbon resin or the like, has generally been used for the above purposes.

For applications requiring a nigh heat resistance or use of the wire in an environment requiring a high degree of vacuum, an organic coating has an insufficient heat resistance and does not satisfy the no gas emission requirement. Thus, an insulated wire of such a form that a conductor is inserted in an insulator tube of ceramics, an MI cable (Mineral Insulated cable) of such a form that a conductor is inserted in a heat resistant alloy tube of a stainless steel alloy etc. which is filled with metal oxide powder of magnesium oxide etc., or the like has been used under the above operating condition.

A fiber-glass braided insulated wire employing textile glass fiber as an insulating member is listed as an insulated wire having a certain flexibility and heat resistance.

The aforementioned insulated wire coated with an organic resin has such a heat resistance that the highest temperature at which insulability can be maintained, is about 200° C. at the most. Therefore, it has been impossible to employ such an organic insulation coated wire under conditions which require a guarantee of the insulability under a high temperature of at least 200° C.

Further, the insulated wire which is improved in its heat resistance by an insulator tube of ceramics, has the disadvantages of an inferior flexibility. An MI cable is formed by a heat resistant alloy tube and a conductor in the tube, whereby the outer diameter of the cable is increased relative to the conductor radius. Thus, the MI cable has a relatively large cross-section with respect to electric energy allowed by the conductor encased in the heat resistant alloy tube. In order to use the MI cable as a wire for winding a coil on a bobbin or the like, however, it is necessary no bend the heat resistant alloy tube along a prescribed curvature. Performing the bending of the heat resistant alloy tube is difficult. When winding the MI cable into a coil it is also difficult to improve the space factor since the tube forming the outer cable layer is thick as compared with the conductor.

Further, when the fiber-glass braided insulated wire having a certain heat resistance is employed and worked into a prescribed configuration in accordance with its use, the network of the braid is disturbed to cause a breakdown. In addition, dust of glass is generated by the glass fibers. This glass dust may serve as a gas adsorption source. Therefore, when the fiber-glass braided insulated wire is used in an environment requiring a high degree of vacuum, it has been impossible to maintain a high degree of vacuum due to the gas adsorption source provided by the glass dust.

A so-called alumite wire is manufactured by performing an anodic oxidation treatment on a wire of aluminum or an aluminum alloy to provide an insulated wire which has an excellent heat resistance, insulability and heat dissipation ability. However; the base material of the alumite wire is restricted to aluminum. Further, an inorganic insulating layer formed on the base material of the aluminum wire is also restricted to aluminum oxide. Thus, there has been a problem in that it is impossible to select combinations of the base conductor wire material and the inorganic insulating layer which are suitable for various uses.

U.S. Pat. No. 3,109,053 (Ahearn), issued Oct. 29, 1963, discloses an insulated conductor wire with a core of silver or copper, an intermediate layer of chromium, rhenium, iron or alloys thereof electroplated onto the core, and a vitreous insulating coating on the intermediate layer. The surface of the intermediate layer is oxidized after completion of the plating. Three different oxidizing procedures are disclosed by Ahearn. First, the plated wire core is heated to 600° C. to 800° C. in air or oxygen. Second, the plated wire core is anodized in an electrolytic bath. Third, the plated surface is coated with a ceramic composition containing an oxidizing agent and heating briefly to the curing temperature of the ceramic. These oxidizing procedures especially heating the plated chromium under the influence of air or oxygen has a strong tendency to form chromic oxide $Cr_2O_3$ in which the atomic ratio of oxygen to Cr is $3/2=1.5$ and chromic oxide does not provide an optimal two-fold adhesion first between the conductor core and the chromic oxide layer and second between the insulating coating and the chromic oxide layer. Tests set forth below show this point. In fact, Ahearn states that in order to further promote adherence of the vitreous insulating coating to the chromic oxide layer the latter's surface must be toughened by sandblasting, acid etching anti the like. This poses a further problem, because the intermediate layer should be as thin as possible and sandblasting may remove the intermediate layer.

SUMMARY OF THE INVENTION

Accordingly, the present invention aims at solving the aforementioned problems, and its object is to provide an insulated electrical conductor wire comprising the following features:

(a) The present wire has a high insulability under high operating temperatures in the range of 300° C. to 900° C.

(b) The present wire has an excellent flexibility.

(c) The present wire does not comprise any gas adsorption source.

(d) Many combinations of a base material forming the conductor wire with an inorganic insulating layer suitable for various uses can be selected due to an improved bonding.

An insulated electrical conductor wire or substrate according to the present invention comprises an electrical conductor core, an intermediate adhesion layer on said conductor core, said intermediate adhesion layer containing a remainder and a chromium oxide $CrO_{3-x}$, wherein x is within the range of $1.5<x\leqq2.5$, whereby the atomic oxygen to chromium ratio is $0.5\leqq O/Cr<1.5$, and an insulating oxide layer on said intermediate adhesion layer, said insulating layer comprising a precursor solution of a metallic oxide applied to said intermediate adhesion layer.

It has been found that an intermediate layer in which the chromium oxide formation is carefully controlled as taught by the invention, to satisfy the condition that the oxygen to chromium ratio O/Cr is at least 0.5, but less than 1.5 provides an excellent bonding of the intermediate layer to the conductor core and to the insulating oxide outer coating or layer. A bonding strength of 18 MPa (mega pascal) was measured for a sample according to the invention. A bonding strength of 2.2 MPa was measured for a sample according to Ahearn. The improved bonding strength according to the invention was obtained even without the extra surface toughening step taught by Ahearn. It is believed that the improvement is due to the fact that the invention avoids the formation of $Cr_2O_3$ (chromic oxide) in the intermediate layer and to the naturally rough surface of the intermediate layer formed according to the invention.

The precursor solution of a metallic oxide applied to the chromium oxide $CrO_{3-x}$ containing layer by a sol-gel method or an organic acid salt pyrolytic method is described in more detail below.

The chromium oxide $CrO_{3-x}$ containing layer is preferably formed by an electrochemical technique, such as electrolytic plating or electroless plating, which are described in more detail below, and which are performed under carefully controlled conditions.

It has been discovered that an intermediate layer containing chromium oxide with an oxide to chromium ratio lower than 1.5, but not less than 0.5 provides an excellent bonding between itself and the base material of the substrate or conductor core and any further insulating oxide layer even without extra toughening steps applied to the intermediate layer.

The insulating oxide layer on the $CrO_{3-x}$ layer preferably contains silicon oxide, aluminum oxide or zirconium oxide. The substrate or base or core material forming the electrical conductor core is preferably copper or a copper alloy which has the desired high electrical conductivity. The present wire conductor is intended for use at higher temperatures within in the range of 300° C. to 900° C. Therefore, a surface layer selected from nickel, chromium, silver, iron or a ferroalloy, a stainless steel alloy, or titanium or a titanium alloy is preferably formed on the surface of the conductor core. The chromium oxide $CrO_{3-x}$ intermediate layer is bonded to the surface layer and the outer insulating layer is secured to the intermediate layer.

It is known that a chrome plated surface layer is formed on a conductor of copper or a copper alloy etc. as an excellent adhesion layer. However, insulating oxide ceramics such as silicon oxide obtained by a heat treatment of a precursor solution of a metallic oxide, hardly exhibits any adhesion on the chrome plated surface layer, as has been found by the present inventors.

In an insulated wire obtained by directly forming an electrically insulating thin film of ceramics on the surface of a copper conductor, the ceramics thin film has an insufficient adhesion to the copper conductor.

The aforementioned intermediate chromium oxide layer of $CrO_{3-x}$ is formed by an electrochemical technique. When the chromium oxide layer is formed by electrolytic plating, an electrolyte of the invention is obtained by adding a small amount of an organic acid to an aqueous solution of chromic anhydride. Although a bath mainly composed of chromic anhydride or sulfuric acid is known as an electrolytic bath employed for chromium plating, the known bath is different from the present bath in the following point: Namely, mineral acid mixed into the known electrolytic bath dissolves the chromic anhydride which is generated on the surface of a plated layer during the electrolytic plating. As a result, conventionally a glossy metallic chrome layer is formed with a smooth surface when such a known bath is employed. Contrary thereto, in the present invention, a rough surface is formed on the intermediate layer of chromium oxide $CrO_{3-x}$ directly during the electrolytic plating. For this purpose the above mentioned small amount of an organic acid is added to an electrolytic bath employed in the present invention. In a case of using a mineral acid such as sulfuric acid, it is necessary to employ a particularly dilute electrolytic bath. Namely, the chromic anhydride concentration is not more than 50 g/l and the sulfuric acid concentration is not more than 1 g/l. When a thin outer film of insulating ceramics is formed on the rough outer surface the present intermediate layer, by a heat treatment of a precursor solution of a metallic oxide, an excellent bonding is achieved between the intermediate layer and the thin outer insulating film.

The intermediate chromium oxide layer may be formed by electrolytic plating employing an electrolyte which is prepared by adding sodium citrate, sodium carbonate or the like, for example, to an aqueous solution of sodium chromate. In this case, the as-formed layer is mainly composed of chromium oxide $CrO_{3-x}$, which is generated by a trivalent seduction of hexavalent chromium contained in the electrolyte. If copper is used as a base or substrate material in this electrolytic plating treatment, the base material surface is oxidized and the chromium oxide $CrO_{3-x}$ containing layer is formed in the exterior thereof. Surprisingly, the adhesion strength of the chromium oxide containing intermediate layer to the base or substrate material is not reduced by such an oxidation of the substrate surface.

The conditions for the electrolytic plating for forming the intermediate chromium oxide $CrO_{3-x}$ containing layer are different from those for general bright plating, especially the treatment current density differs. Although the current density is set at 10 to 60 $A/dm^2$ in a bright plating bath, depending on the treatment temperature, the current density is set at 100 to 200 $A/dm^2$ in practicing the present invention, whereby a chromium oxide $CrO_{3-x}$ containing layer having a roughened surface is formed. This toughened surface enhances the bonding.

On the chromium oxide $CrO_{3-x}$ containing layer an insulating oxide layer is formed by application of a precursor solution of a metallic oxide which is prepared of a metal organic compound broadly classified in correspondence to a sol-gel method or an organic acid salt pyrolytic method, and those of the following two types are included in the group of precursors suitable for the invention.

The first precursor member suitable for practicing the present invention is a precursor solution which is produced by a hydrolytic reaction and a dehydration and/or condensation reaction of a compound containing hydrolyzable metal-oxygen-organic group bonds such as a metal alkoxide or an acetate of a metal. This precursor solution may contain an organic solvent such as alcohol, a raw material compound such as metal alkoxide, and water and a catalyst required for hydrolytic reaction. Further, it generally contains an organic residual group such as an alkoxide, dissimilarly to hydroxide sol that is produced with an inorganic salt.

The second precursor member suitable for practicing this invention is a precursor solution prepared by dissolving a metal organic compound such as an organic acid salt of a metal, in an appropriate organic solvent. In a method employing this type of precursor solution, a metallic oxide is produced by pyrolyzation through heating after application of the precursor solution to the intermediate layer. Therefore, the decomposition temperature of the employed metal organic compound must be lower than its boiling point or sublimation point.

The metal organic compound mentioned in this specification involves a concept similar to that relating to "metal-organic compounds" described in "Journal of Materials Science" No. 12 (1977) pp. 1203 to 1208, for example.

Further, the applied precursor layer must be left at a temperature higher than room temperature for volatilization of the organic solvent and for removal of any residual organic substance. However, the temperature of the atmosphere for such volatilization and removal must not be higher than the melting point of the metal forming the base material of the substrate.

It is possible to form almost all metallic oxide-based ceramic coatings suitable for the present purposes by applying a precursor solution of a metallic oxide to the intermediate layer. $SiO_2$, $Al_2O_3$, $ZrO_4$, $TiO_2$, MgO or the like can be listed as an example of a metallic oxide formed as described above. Further, ethoxide, propoxide, butoxide or the like can be listed as metal alkoxides employed as the first type of pro, cursor solution mentioned above. Metallic salt such as naphtanic acid, caprylic acid, stearic acid, octylic acid or the like, is preferable as organic salt employed as the second type of precursor solution.

The insulating oxide outer layer formed by the precursor solution of the metallic oxide by the sol-gel method or the organic acid salt pyrolytic method, is an oxide which is completely converted to a metallic oxide which oxide is preferably formed by a heat treatment in an atmosphere of an oxygen current. In general, decomposition of the compound contained in the solution which is applied onto the chromium oxide $CrO_{3-x}$ containing intermediate layer, is completely terminated at a temperature of about 500° C. If the heat treatment is performed at a higher temperature, however, a reaction between elements forming the chromium oxide containing intermediate layer and a metal or semimetal contained in the applied solution is facilitated, whereby the adhesion bond between the intermediate chromium oxide containing layer and the insulation oxide layer is improved.

Thus, the insulating oxide outer layer converted to a ceramic exhibits an excellent heat resistance and insulation ability even under a high temperature of at least 500° C. Further, the chromium oxide containing intermediate layer also has an excellent adhesion to the conductor forming the base material or substrate. Therefore, the adhesion between the oxide insulating layer and the outer surface of the base material is improved compared to the case of directly forming the oxide insulating layer on the outer surface of the conductor by heat treatment of the precursor solution of the metallic oxide. Thus, the insulated wire provided according to the present invention has a high heat resistance even at temperatures above 500° C. and a good insulability, as well as an excellent flexibility Further, the insulating oxide outer layer formed on the intermediate chromium oxide containing layer, has a smooth outer surface. Therefore, a high breakdown voltage proportionate to the film or layer thickness of said outer layer can be obtained, while it is possible to reduce the presence of a gas adsorption source in the outer layer.

Due to providing the intermediate chromium oxide containing layer, it is possible according to the invention to combine therewith an insulating inorganic oxide layer suitable for various uses such as the use at high temperatures within the range of 300° C., to 900° C.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Example 1

Step (a) Formation of a low oxygen content chromium oxide containing intermediate layer.

An electrolytic plating treatment was performed on an outer surface of a copper wire having a diameter of 2 mm. At this time, an electrolyte was prepared to have a concentration of 40 g/l of chromic anhydride, and 0.45 g/l of sulfuric acid. The plating conditions were as follows: the bath temperature was 50° C., the current density was 140 A/dm², and the treatment time was two minutes. Thus, a chromium oxide containing layer was formed on the outer surface of the copper wire forming a cathode in the electrolytic plating bath. The so formed intermediate layer had a layer thickness of about 1 μm and a surface roughness Ra of at least 0.15 μm.

The intermediate layer containing $CrO_{3-x}$ formed according to Example 1 Step (a) has been chemically analyzed as follows. The quantitative chromium analysis is was carried out in accordance with the "precipitation from a homogeneous solution" (PFHS) method. The quantitative analysis for the lighter elements C, H, N, and O was carried out in accordance with the fusion method using a combination tube for analyzing each of these elements. The analysis was carried out twice, namely once with the hydrate included and after the removal of the hydrate by heating the coating following Step 1c. The results are shown in Table 1.

TABLE 1

| | wt. % | % | Before Hydrate Removal atomic composition (mole equivalent) with respect to Cr | After Hydrate Removal atomic composition (mole equivalent) with respect to Cr |
|---|---|---|---|---|
| Cr | 56.40 | 1.08 | 1.00 | 1.00 |
| C | 2.50 | 0.21 | 0.19 | 0.19 |
| H | 1.50 | 1.49 | 1.37 | 0.00 |
| N | 2.50 | 0.18 | 0.16 | 0.16 |
| O | 37.10 | 2.32 | 2.14 | 1.45 |

As is apparent from the atomic composition after the removal of hydrate shown in Table 1, $O/Cr = 1.45 < 1.5$.

Example 1

Step (b) Preparation of a coating solution used for performing a sol-gel method.

Nitric acid was added to a solution mixed in mole ratios, of tetrabutyl orthosilicate:water:isopropyl alcohol=8:32:60 in a ratio of 3/100 mole relative to tetrabutyl orthosilicate. Thereafter this solution was heated and stirred at a temperature of 80° C. for two hours, whereby the coating solution used for a sol-gel method was synthesized.

Example 1

Step (c) Coating.

The wire obtained by (a) was dipped in the coating solution of (b). The so coated wire was heated at a temperature of 400° C. for 10 minutes and dipped and heated ten times, whereby the outer surface of the chromium oxide was coated with the coating solution. Finally, this wire was heated in an oxygen current at a temperature of 500° C. for 10 minutes.

Figure 1:
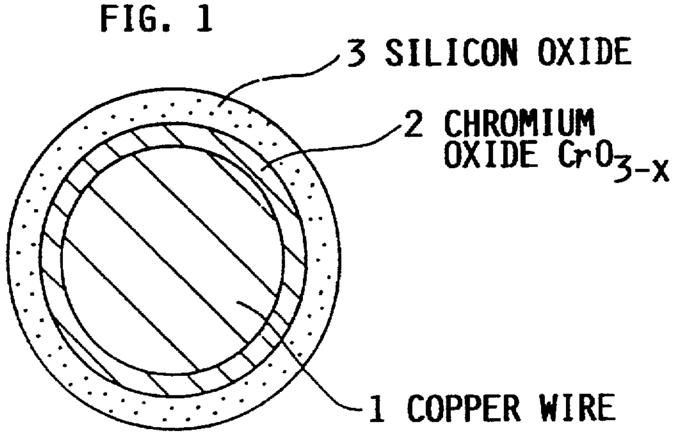
FIG. 1 is a sectional view showing a cross-section of an insulated wire according to the present invention corresponding to Example 1.

An insulation covered wire obtained according to Example 1 in the aforementioned manner, is shown in a sectional view in FIG. 1. Referring to FIG. 1, a chromium oxide containing intermediate layer 2 is formed on an outer surface of a copper wire 1. On this chromium oxide containing layer 2, a silicon oxide layer 3 is formed by the sol-gel method as an insulating oxide layer. The film or layer thickness of the insulating laminate formed by the chromium oxide containing intermediate layer 2 and by the silicon oxide layer 3 was about 4.0 μm.

A breakdown voltage was measured in order to evaluate the insulability or insulation ability of the obtained insulated wire. The breakdown voltage of the wire according to Example 1 was 800 V at room temperature and it was 600 V at a temperature of 800° C. Even if this insulated wire was wound on an outer peripheral surface of a cylinder having a diameter of 10 cm, no cracking was caused in the insulating laminate.

Example 2

Step (a) Formation of a low oxygen content chromium oxide containing intermediate layer.

A copper wire having a diameter of 2 mm was vapor-degreased by using perchloroethylene. Thereafter, the copper wire was dipped in a solution mixed in volume ratios of 85% phosphoric acid:70% nitric acid:-water=15:2:3, thereby roughening its surface.

Then, the copper wire was used as a cathode and a stainless steel plate was used as an anode to perform an electrolytic plating treatment by feeding a direct current of 0.05 $A/dm^2$ through the bath. A solution of about 1 l prepared by dissolving 30 g of sodium chromate, 30 g of sodium citrate and 30 g of sodium carbonate in water respectively, was used as an electrolyte.

Thus, a copper oxide coating having a thickness of about 1 μm was formed on the outer surface of the copper wire which forms together with its copper oxide coating a substrate on which a chromium oxide containing layer was formed with a film thickness of about 0.1 μm.

Example 2

Step (b) Preparation of coating solution used for a sol-gel method.

A solution, mixed in mole ratios, of tetrabutyl orthozirconate $(C_4H_9O)_4Zr$:water:n-butyl alcohol=5:15:80 was heated and stirred at a temperature of 120° C. for two hours, whereby the coating solution used for a sol-gel method was synthesized.

Example 2

Step (c) Coating.

The wire obtained by (a) was dipped in the coating solution of (b). Heating at a temperature of 400° C. for 10 minutes and dipping was performed ten times on the wire for coating the wire with the coating solution.

Figure 2:
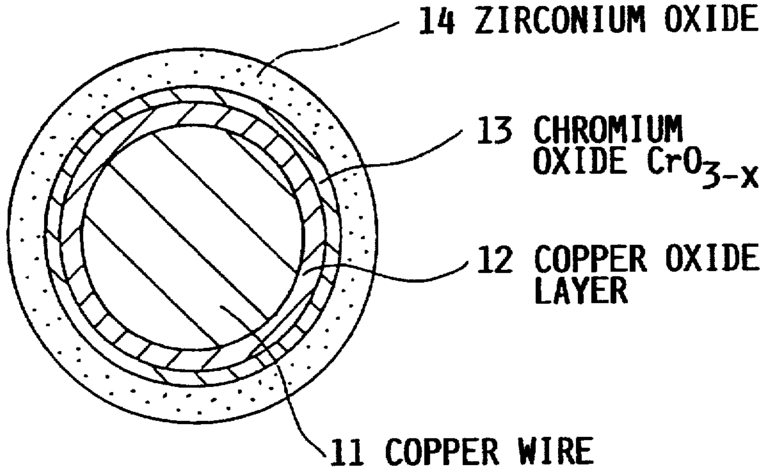
FIG. 2 is a sectional view showing a cross-section of an insulated wire according to the present invention corresponding to Example 2.

An insulated covered wire obtained in the aforementioned manner is shown in FIG. 2 showing a cross-section of the insulated wire of Example 2. Referring to FIG. 2, a copper oxide layer 12 is formed on the outer surface of a copper wire 11. The copper wire 11 and its oxide coating form together a substrate to which a chromium oxide containing layer 13 is applied on the outer surface of the copper oxide layer 12. On this chromium oxide containing layer 13, a zirconium oxide layer 14 is formed by the sol-gel method as an oxide insulating layer. The laminate thickness of an insulating layer formed by the copper oxide layer 12, the chromium oxide containing layer 13, and the zirconium oxide layer 14 was about 3.0 μm.

The breakdown voltage was measured in order to evaluate the insulability of the insulated wire of Example 2. Its breakdown voltage was 700 V at room temperature, and it was 500 V at a temperature of 700° C. Even if this insulated wire was wound on an outer peripheral surface of a cylinder having a diameter of 10 cm, no cracking was caused in the insulating layer by such winding.

Example 3

Step (a) Formation of chromium oxide containing layer.

An electrolytic plating treatment was performed on an outer surface of a nickel plated copper wire having a diameter of 1.8 mm. An electrolyte was prepared having a concentration of 200 g/l of chromic anhydride, 20 g/l of ammonium methavanadate, and 6.5 g/l of acetic acid. The plating conditions were as follows. The base material forming a substrate was used as a cathode, the bath temperature was 50° C., the current density was 150 A/dm², and the treatment time was two minutes. Thus, a chromium oxide containing layer was formed on the outer surface of the nickel plating of the copper wire forming a cathode in the electrolytic plating bath. The resulting film thickness was about 1 μm.

Figure 5:
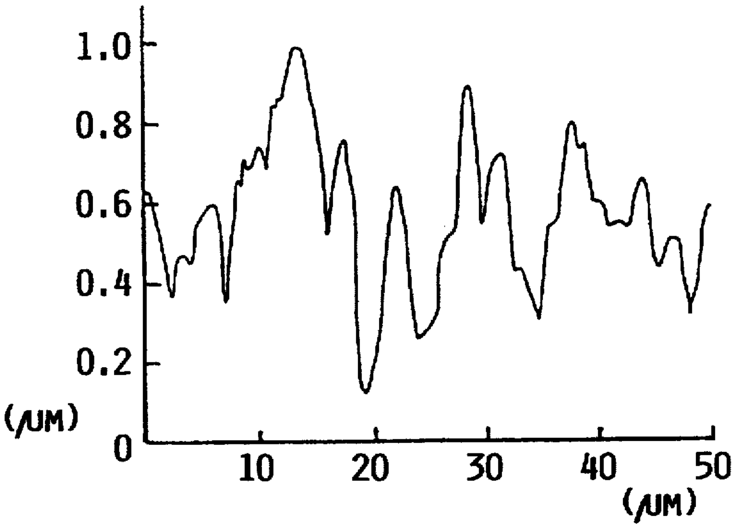
FIG. 5 is a graph showing the result of measuring the surface roughness of a chromium oxide containing intermediate layer formed in accordance with Example 3 or Example 4.

The surface of the chromium oxide containing layer had a center line average roughness Ra of 0.15 μm and the maximum roughness height Ry was 0.87 μm in accordance with Surface Roughness Standard ISO468-1982. The surface roughness was measured by using a surface contour measurer DEKTAK3030 made by Sloan Inc., U.S.A., under conditions off a tracer diameter of 0.5 μm, a stylus pressure of 10 mg, a reference length of 50 μm, and no use of a cutoff filter. The result of the measurement is shown in FIG. 5.

The intermediate layer containing $CrO_{3-x}$ formed according to Example 3 Step (a) has been analyzed as follows. The quantitative chromium analysis was carried out in accordance with the above mentioned PFHS method. Vanadium was quantified by the Energy Dispersion X-ray fluorescence spectroscopy, known as EDX method. The quantitative analysis for C, H, N, and O was carried out by the above mentioned fusion method using a combination tube for each of the elements. The analysis wee carried out twice before and after hydrate removal by heating following Step 3c. The results are shown in Table 2.

TABLE 2

| | wt. % | % | Before Hydrate Removal atomic composition (mole equivalent) with respect to Cr | After Hydrate Removal atomic composition (mole equivalent) with respect to Cr |
|---|---|---|---|---|
| Cr | 56.00 | 1.08 | 1.00 | 1.00 |
| C | 0.00 | 0.00 | 0.00 | 0.00 |
| H | 1.25 | 1.24 | 1.15 | 0.00 |
| N | 0.50 | 0.04 | 0.03 | 0.03 |
| O | 26.00 | 1.63 | 1.51 | 0.93 |
| V | 16.25 | 0.32 | 0.30 | 0.30 |

As is apparent from the atomic composition after removal of the hydrate as shown in Table 2, O/Cr=0.93<1.5.

Example 3

Step (b) Preparation of a coating solution used for the organic acid salt pyrolytic method.

A coating solution was prepared by dissolving 20 g of 2-ethylhexanoic silicate in 100 ml of dibutyl ether.

Example 3

Step (c)

Figure 3:
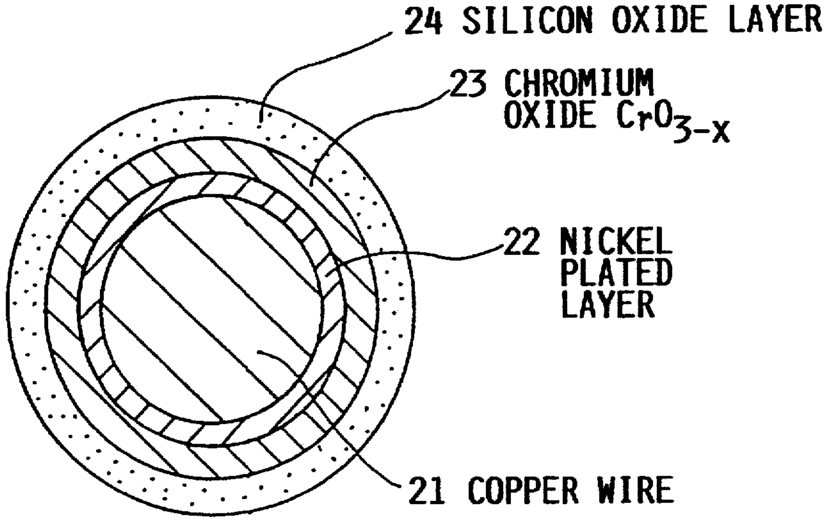
FIG. 3 is a sectional view showing a cross-section of an insulated -wire according to the present invention corresponding to Example 3.

The wire obtained by (a) was dipped in the coating solution of (b). The dipped wire was heated at a temperature of 500° C. for 10 minutes and the dipping and heating was performed ten times to apply the coating solution on the outer surface of the wire. An insulated coated wire obtained in the aforementioned manner is shown in FIG. 3 showing a cross-section of the insulated wire according to Example 3. Referring to FIG. 3, a nickel plated copper wire comprising a nickel plated layer 22 formed on an outer surface of a copper wire 21 is used as a base material or substrate. A chromium oxide containing layer 23 is formed on the outer surface of the nickel plating of the copper wire. An insulating silicon oxide layer 24 was formed on the chromium oxide containing layer 23 by an organic acid salt pyrolytic method. The laminate thickness of an insulating layer formed by the chromium oxide containing layer 23 and by the silicon oxide layer 24 was about 5 μm.

The breakdown voltage was measured in order to evaluate the insulability of the obtained insulated wire. The breakdown voltage was 500 V at room temperature, and it was 300 V at a temperature of 800° C. Even if this insulated wire was wound on an outer peripheral surface of a cylinder having a diameter of 5 cm, no cracking was caused in the insulating layer.

Example 4

Step (a) Formation of a chromium oxide containing layer.

A so-called stainless steel clad copper wire having a diameter of 1.8 mm and a stainless steel alloy (SUS304) as a coating on its outer surface was used as a base material or substrate. An electrolytic plating treatment was performed on the outer surface of this stainless steel clad cooper wire. An electrolyte was prepared having a concentration of 200 g/l of chromic anhydride, 20 g/l of ammonium methavanadate, and 6.5 g/l of acetic acid. The plating conditions were as follows. The base material or substrate was used as a cathode. The bath temperature was 50° C. The current density was 150 A/dm² and the treatment duration was two minutes. Thus, a chromium oxide containing layer was formed on the outer surface of the stainless steel cladding of the copper wire with a film thickness of about 1 μm.

The surface had a center line average roughness Ra of 0.15 μm, and the maximum height Ry of the roughness was 0.87 μm in accordance with Surface Roughness Standard of IS0468-1982. The measurement was performed by using a surface contour measurer DEKTAK3030 made by Slosh Inc., U.S.A., under conditions of a tracer diameter of 0.5 μm, a stylus pressure of 10 mg, a reference length of 50 μm, and no use of a cutoff filter. The result of this measurement is also as shown in FIG. 5 similarly to Example 3.

Example 4

Step (b) Preparation of a coating solution used for the organic acid salt pyrolytic method.

25 g of aluminum tetra-i-butoxide was dissolved in 100 ml of diethylene glycol monomethyl ether and thereafter heated and stirred at 150° C. for one hour. This solution was permitted to cool to room temperature, and thereafter mixed with 3 g of alumina particles of 0.03 μm in nominal particle size to prepare the coating solution.

Example 4

Step (c) Coating

The wire obtained by (a) was dipped in the coating solution of (b). The dipped wire was heated at a temperature of 500° C. for 10 minutes and dipping and heating was repeated ten times to coat the outer wire surface with the coating solution.

Figure 4:
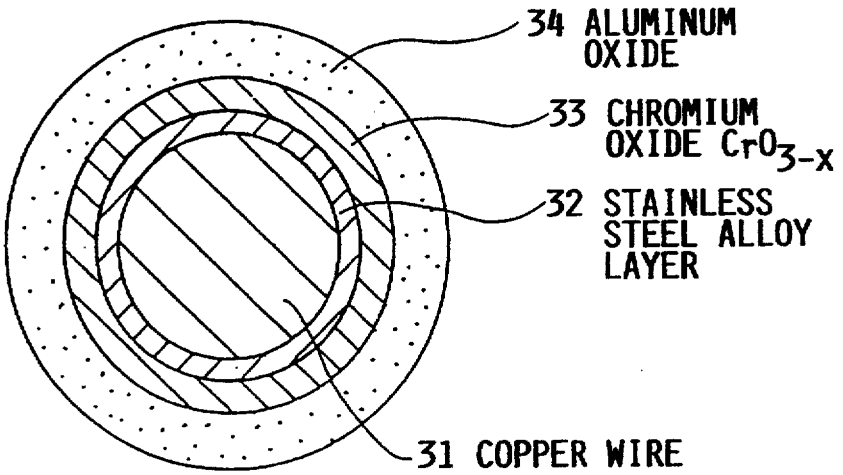
FIG. 4 is a sectional view showing a cross-section of an insulated wire according to the present invention corresponding to Example 4.

An insulated covered wire obtained in the aforementioned manner is shown in FIG. 4 showing a cross-section of the insulated wire of Example 4. Referring to FIG. 4, a stainless steel clad copper wire having a stainless steel alloy layer 32 on its outer surface on a copper wire core 31 is used as a base material or substrate. A chromium oxide containing layer 33 is formed on the outer surface of the stainless steel cladding of the copper wire core. An aluminum oxide layer 34 is formed on the chromium oxide containing intermediate layer 33 by an organic acid salt pyrolytic method. This aluminum oxide layer 34 consists of an aluminum oxide mixed layer containing aluminum particulates which have been mixed into the coating solution as described above. The laminate thickness of an insulating layer formed by the chromium oxide containing layer 33 and the aluminum oxide layer 34 was about 12 μm.

The breakdown voltage was measured in order to evaluate the insulability of the so produced insulated wire. The breakdown voltage was 900 V at room temperature, and it was 700 V at a temperature of 800° C. Even if this insulated wire was wound on an outer peripheral surface of a cylinder having a diameter of 15 cm, no cracking was caused in the insulating layer.

Reference Example 1

Step (a) Formation of metallic chrome plated layer.

An electrolytic plating treatment was performed on an outer surface of a nickel plated copper wire having a diameter of 1.8 mm. An electrolyte to be used for the plating was prepared to have a concentration of 250 g/l of chromic anhydride and 2.5 g/l of sulfuric acid. The plating conditions were as follows. The base material or substrate was used as a cathode. The bath temperature was 50° C. The current density was 40 A/dm$^2$ and the treatment time was two minutes. Thus, a chrome containing layer was formed on the outer sur face of the nickel plated copper wire with a layer thickness of about 1 μm.

Figure 6:
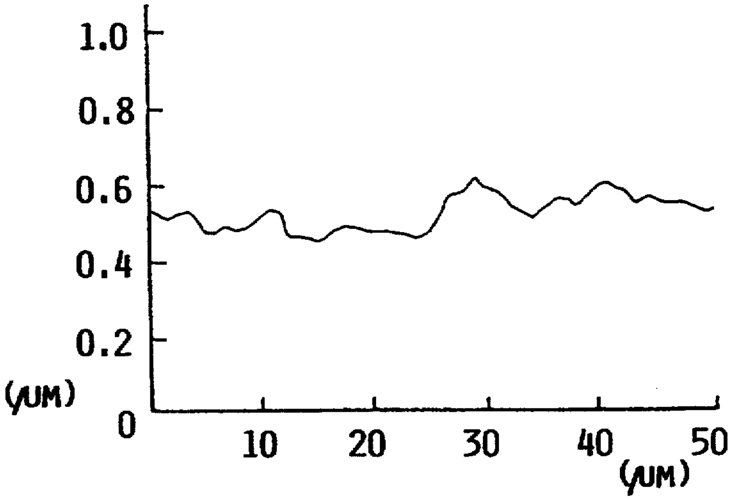
FIG. 6 is a graph showing the result of measuring the surface roughness of a chrome plated layer formed in accordance with a Reference Example.

The surface had a center line average roughness Ra of 0.06 μm and the maximum height Ry of the roughness was 0.51 μm in accordance with the Surface Roughness Standard ISO468-1982. The measurement was performed by using a surface contour measurer DEKTAK3030 made by Sloan Inc., U.S.A., under conditions of a tracer diameter of 0.5 μm, a stylus pressure of 10 mg, a reference length of 50 μm, and no use of a cutoff filter. The result of this measurement is shown in FIG. 6. A glossy metallic chrome layer was formed on the outer surface of the nickel plated copper wire.

Reference Example 1

Step (b) Preparation of a coating solution used for the organic acid salt pyrolytic method.

A coating solution was prepared by dissolving 20 g of 2-ethyl-hexanoic silicate in 100 ml of dibutyl ether.

Reference Example 1

Step (c) Coating.

The wire obtained by (a) was dipped in the coating solution of (b). The dipped wire was heated at a temperature of 500° C. for 10 minutes, whereby the as-formed insulating layer was separated like a film after heating, and exhibited no adhesion.

INDUSTRIAL AVAILABILITY

Reference Example 2

A copper conductor wire was plated with chromium as disclosed in U.S. Pat. No. 3,109,053 (Ahearn). The plated wire was heated for 30 minutes at 750° C. in the ambient atmosphere to oxidize the chromium plating. The resulting chromic oxide was $Cr_2O_3$ as shown by the results set forth in Table 3 based on a surface analysis by X-ray photoelectron spectroscopy. The spectroscope used was Model ESCA-750 manufactured by Shimadzu Corporation. The measuring conditions were as follows:

$MgK_\alpha$, 8 kv−30 mA; $Ar^+$ 2 kV−20 mA−2 min.

TABLE 3

| | Atomic Composition (mole equivalent) | |
|---|---|---|
| Component | % | with respect to Cr |
| Cr | 38.3 | 1.00 |
| C | 2.8 | 0.07 |
| H | 0.0 | 0.00 |
| N | <0.1 | 0.00 |
| O | 58.9 | 1.54 |

It is apparent from the atomic composition of Reference Example 2, shown in Table 3 that the O/Cr ratio in Ahearn is 1.54>1.5 which shows that chromic oxide $Cr_2O_3$ is involved which is outside the scope of the invention and does not provide the bonding strength as is shown below in Table 4.

Figure 7:
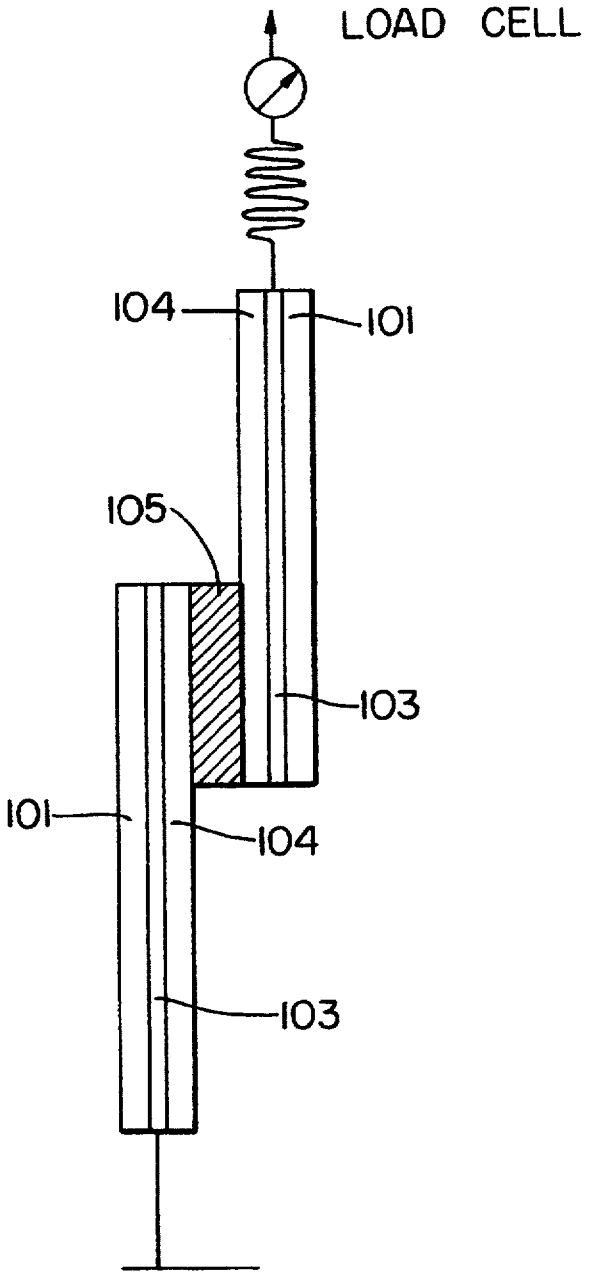
FIG. 7 illustrates an arrangement for testing the peel strength between the intermediate layer and the substrate and between the intermediate layer and the insulating oxide layer.

Referring to FIG. 7, the bonding strength was tested as follows for one sample prepared in accordance with steps (a), (b) and (c) of Example 3 according to the invention and for one sample according to Ahearn plated as in Reference Example 2 and coated on the surface of the chromic oxide layer $Cr_2O_3$ as set forth in Reference Example 1, steps (b) and (c). In both instances, the arrangement for the testing was the same as shown in FIG. 7.

The core or substrate 101 was formed as a copper plate 50 mm×100 mm×3 mm. In the sample based on Invention Example 3 the copper plate 101 was first plated with nickel, followed by formation of the chromium oxide ($CrO_{3-x}$) containing layer 103 which was then coated with a silicon monoxide layer 104 as in Example 3, step (c). Two such members were prepared and the silicon monoxide surfaces were glued to each other by an acrylic adhesive 105 covering an adhesion area of 100 mm$^2$ for testing the bonding strength by applying a shearing force as shown in FIG. 7 in a conventional tensile tester. The silicon oxide layers were separated from the $CrO_{3-x}$ layer at a shearing load of 18 MPa.

Reference Example 2 was also prepared as described above and shown in FIG. 7. The insulating layer was separated from the chromic oxide layer $Cr_2O_3$ at a shearing load of 2.2 MPa. The results of the tests made according to FIG. 7 are shown in Table 4 which also shows the surface roughness Ra measured as disclosed above.

TABLE 4

| | Ra of chromium oxide containing layer | Adhesiveness of insulating layer |
|---|---|---|
| Example 3 | 0.15 μm | 18 MPa |
| Reference Example 2 | 0.11 μm | 2.2 MPa |

As hereinabove described, the insulated conductor wire according to the present invention is suitable for circuit wiring for forming windings or the like, and is useful in a high-vacuum environment or in a high-temperature environment such as a high vacuum apparatus or a high temperature service apparatus.

Although the invention has been described with reference to specific example embodiments, it will be appreciated that it is intended to cover all modifications and equivalents within the scope of the appended claims.

What we claim is:

1. An insulated electrical conductor wire, comprising an electrical conductor core, an intermediate adhesion layer on said conductor core, said intermediate adhesion layer containing a chromium oxide $CrO_{3-x}$, wherein x is within the range of greater than 1.5 to 2.5, whereby the atomic oxygen to chromium ratio is in the range of 0.5 to less than 1.5, and a remainder selected from the group consisting of carbon traces, nitrogen traces, vanadium traces and traces of naturally occurring impurities, excluding chromic anhydride, said conductor wire further comprising an insulating oxide layer on said intermediate adhesion layer, said insulating oxide layer comprising a precursor solution of a metallic oxide applied to said intermediate adhesion layer, said intermediate adhesion layer having an adhesion strength to said conductor core and to said insulating metallic oxide layer within the range of more than 2.2 MPa to 18 MPa.

2. The insulated electrical conductor wire of claim 1, wherein said intermediate adhesion layer is an electrolytically deposited plating layer.

3. The insulated electrical conductor wire of claim 1, wherein said insulating oxide layer contains at least one oxide member selected from the group consisting of: silicon oxide, aluminum oxide, and zirconium oxide.

4. The insulated electrical conductor wire of claim 1, wherein said electrical core conductor contains at least one member selected from the group consisting of copper and copper alloy.

5. The insulated electrical conductor wire of claim 4, wherein said electrical core conductor forms a substrate comprising a surface coating directly on said substrate, said intermediate adhesion layer being bonded to said surface coating on said substrate, said surface coating containing at least one member selected from the group consisting of nickel, chromium, and stainless steel alloy.

6. The insulated electrical conductor wire of claim 1, wherein said insulating oxide layer comprises ceramic particles dispersed in said insulating oxide layer.

7. The insulated electrical conductor wire of claim 1, wherein said insulating oxide layer is formed by a sol-gel method on said intermediate adhesion layer.

8. The insulated electrical conductor wire of claim 1, wherein said insulating oxide layer is a pyrolytic layer formed layer on said intermediate adhesion layer.

9. The insulated electrical conductor wire of claim 1, wherein said intermediate adhesion layer has a center-line average surface roughness Ra of at least 0.15 mm.

10. The insulated electrical conductor wire of claim 9, wherein said intermediate adhesion layer has a maximum surface roughness Ry of about 0.87 $\mu$m.

11. The insulated electrical conductor wire of claim 1, wherein said intermediate layer has been formed by a trivalent reduction of hexavalent chromium in an electrolyte.

* * * * *

UNITED STATES PATENT AND TRADEMARK OFFICE
CERTIFICATE OF CORRECTION

PATENT NO. : 5,372,886

DATED : December 13, 1994

INVENTOR(S) : Inazawa et al.

It is certified that error appears in the above-identified patent and that said Letters Patent is hereby corrected as shown below: On the title page:

In [30] Foreign Application Priority Data insert the following:

--PCT PCT/JP90/00401 03/26/90--.

Col. 2, line 51, replace "toughened" by --roughened--;
line 52, replace "anti" by --and--.

Col. 3, line 25, replace "toughening" by --roughening--;
line 46, replace "toughening" by --roughening--.

Col. 4, line 43, replace "seduction" by --reduction--;
line 61, replace "toughened" by --roughened--.

Col. 5, line 45, replace "pro, cursor" by --precursor--.

Col. 6, line 38, replace "-wire" by --wire--.

Col. 7, line 15, after "and" insert --once--.

Col. 9, line 31, replace "wee" by --was--;
line 62, after "wire." insert a paragraph spacing.

Col. 10, line 40, replace "Slosh" by --Sloan--.

Col. 11, line 32, replace "sur face" by --surface--.

UNITED STATES PATENT AND TRADEMARK OFFICE
CERTIFICATE OF CORRECTION

PATENT NO. : 5,372,886

DATED : December 13, 1994

INVENTOR(S) : Inazawa et al.

It is certified that error appears in the above-identified patent and that said Letters Patent is hereby corrected as shown below:

In the Claims:

Claim 8, col. 14, line 20, replace "layer" by --by an organic acid salt--.

Claim 9, col. 14, line 23, replace "mm" by --μm--.

Claim 10, col. 14, line 26, after "roughness" insert --height--.

Signed and Sealed this

Fourteenth Day of March, 1995

Attest:

BRUCE LEHMAN

*Attesting Officer* *Commissioner of Patents and Trademarks*